United States Patent
Uno

(10) Patent No.: US 7,406,367 B2
(45) Date of Patent: Jul. 29, 2008

(54) INPUT CIRCUIT FOR BICYCLE COMPONENT

(75) Inventor: Kouji Uno, Osaka (JP)

(73) Assignee: Shimano Inc., Osaka (JP)

( * ) Notice: Subject to any disclaimer, the term of this patent is extended or adjusted under 35 U.S.C. 154(b) by 736 days.

(21) Appl. No.: 10/926,390

(22) Filed: Aug. 26, 2004

(65) Prior Publication Data

US 2006/0047372 A1    Mar. 2, 2006

(51) Int. Cl.
*B62M 7/00* (2006.01)
(52) U.S. Cl. .......................................... 701/1; 180/206
(58) Field of Classification Search ............. 701/1; 180/206, 220, 65.2, 65.1, 207; 474/70, 71, 474/80, 101, 103, 110
See application file for complete search history.

(56) References Cited

U.S. PATENT DOCUMENTS

| | | | | |
|---|---|---|---|---|
| 5,213,548 A | * | 5/1993 | Colbert et al. | 474/71 |
| 5,599,244 A | * | 2/1997 | Ethington | 474/70 |
| 5,603,388 A | * | 2/1997 | Yaguchi | 180/206 |
| 5,992,553 A | * | 11/1999 | Morrison | 180/206 |
| 6,588,528 B2 | * | 7/2003 | Ligman | 180/206 |

* cited by examiner

*Primary Examiner*—Dalena Tran
(74) *Attorney, Agent, or Firm*—Global IP Counselors, LLP

(57) ABSTRACT

A bicycle component is provided with a manual input device, and an input circuit having a signal line, a power line and a comparison section. The input circuit is especially useful in electronic shifting. The manual input device has a first ON position, a second ON position and an OFF position. The signal line produces a pair of input signals corresponding to the first and second ON positions. The comparison section produces pair of output signals based on a comparison of the input signals with a reference signal from the power line. Preferably, the input circuit includes a power saving mode.

44 Claims, 9 Drawing Sheets

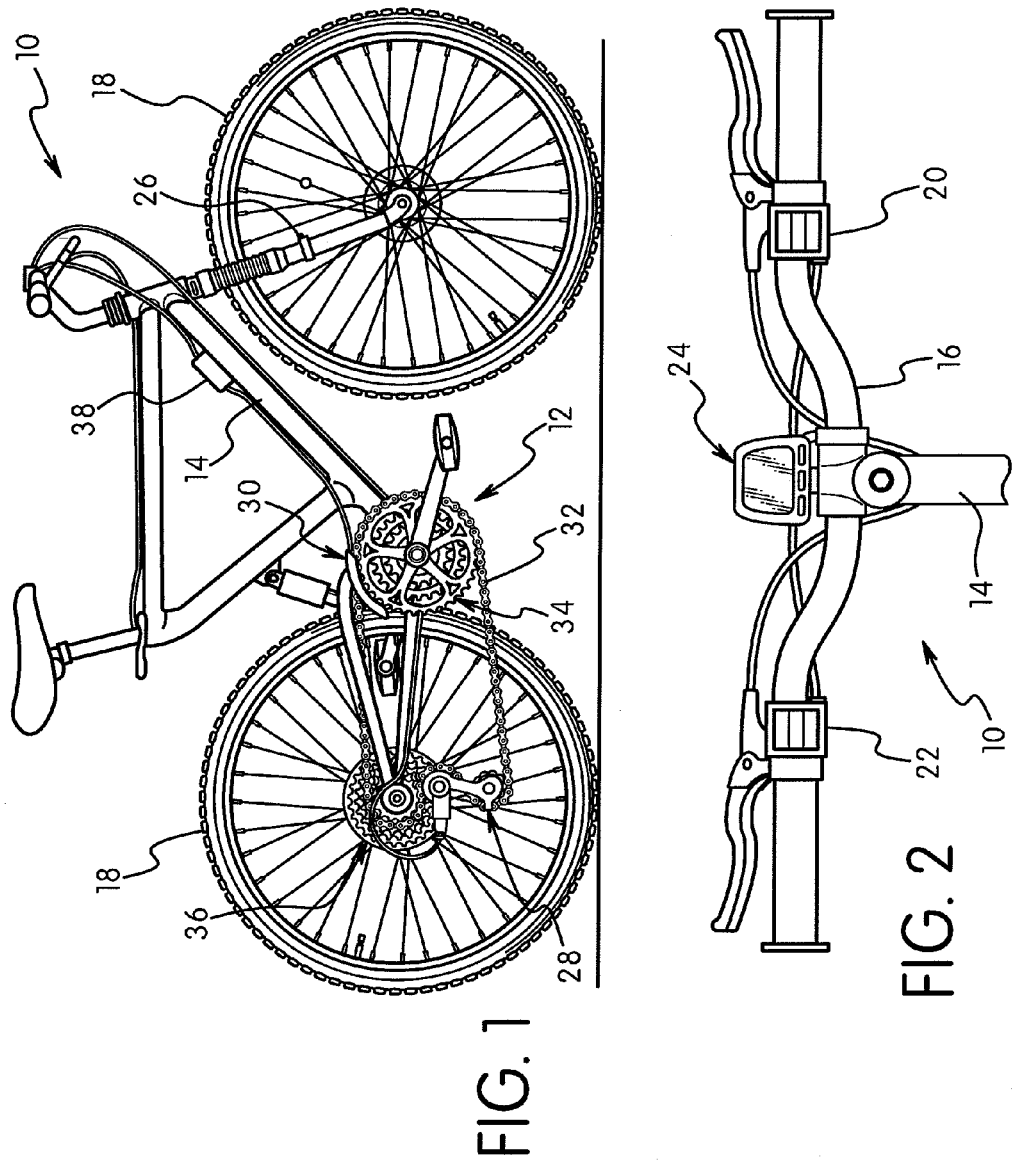

INPUT CIRCUIT FOR BICYCLE COMPONENT

BACKGROUND OF THE INVENTION

1. Field of the Invention

This invention generally relates to an input circuit. More specifically, the present invention relates to an input circuit for controlling electronic bicycle components, such as an electronic shifter.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle shifting device.

Recently, bicycle components have become electronically controlled so as to increase the performance of the bicycle and the ease of operating the bicycle. In particular, bicycles have been provided with an electronic drive train for smoother shifting and electronically controlled suspensions for a smoother ride. Many times, these electronically controlled bicycle components allow for the rider to at least partially select various modes of operations.

In the case of electronic drive trains, the bicycle can be provided with a rear shifting device and/or a front shifting device. These electronic shifting devices can take a variety of forms. For example, the rear shifting device of the electronic drive train can have a motorized internal rear hub or a rear multi-stage sprocket assembly with a motorized rear derailleur. In any case, the electronic shifting devices are typically electronically operated by a cycle computer for automatically and/or manually shifting of the electronic shifting devices.

The cycle computer is also often coupled to other components that are electrically controlled or operated. For example, some bicycles include electronically controlled suspension assemblies for adjusting the stiffness of the ride depending on a variety of factors.

The cycle computer uses one or more sensors to monitor various operations of the bicycle, such as speed, cadence, riding time and gear position, which are in turn used to electrically control or operate these electronic components. In this type of an arrangement, electrical wires or cords are utilized to transmit the electrical current to and from the various components and sensors. These electrical wires or cords are often connected to the components and/or sensors by electrical connectors.

These electronically controlled bicycle components are typically operated by an operating device that is mounted on the handlebar of the bicycle. The rider pushes a button and a motor is activated to operate the electronically controlled bicycle components. In the case of a derailleur, the rider pushes a button for completing a shift operation. In the case of a suspension assembly, the rider pushes a button for changing the stiffness of the ride. It is desirable to provide an operating device that is relatively easy to use without looking at the operating device and that is relatively compact.

Also, with bicycling comes the exposure to outdoor conditions. The cycle computer and/or the operating device can be damaged or rendered inoperable by rain, mud, moisture or other destructive elements.

In view of the above, it will be apparent to those skilled in the art from this disclosure that there exists a need for an improved operating device that responds quickly to received inputs. There also exists a need for an improved operating device and/or cycle computer with fewer components that relieves the disturbance caused by water. There further exists a need for a power saving means in the operating device and/or cycle computer. This invention addresses these needs in the art as well as other needs, which will become apparent to those skilled in the art from this disclosure.

SUMMARY OF THE INVENTION

One aspect of the present invention is to provide an electrical operating device for a bicycle that can control two electrical operating bicycle components.

One object of the present invention is to provide an electrical operating device for a bicycle that is relatively easy to use.

Another object of the present invention is to provide an electrical operating device that is relatively easy and inexpensive to manufacture.

Another object of the present invention is to provide an input circuit that is configured to save electrical power.

In accordance with one aspect of the present invention, the foregoing objects can basically be attained by providing a bicycle component comprising a manual input device and an input circuit having a signal line, a power line and a comparison section. The manual input device is configured and arranged to include a first ON position, a second ON position and an OFF position. The first ON position and the second ON position are formed by a first electrical contact and a second electrical contact, respectively. The signal line is configured and arranged to be selectively coupled to the first and second electrical contacts by operation of the manual input device to produce first and second input signals, respectively, with different electrical characteristics. The power line is electrically coupled to the manual input device and is configured and arranged to be connected to a power source. The comparison section is electrically coupled to the power line and the signal line. The comparison section is configured and arranged to produce a first output signal based on a comparison of the first input signal with a reference signal from the power line and a second output signal based on a comparison of the second input signal with the reference signal from the power line.

In accordance with another aspect of the present invention, the foregoing objects can basically be attained by providing a bicycle component comprising a manual input device and an input circuit having a comparison section, a signal line, a power line and a power disconnect switch. The manual input device is configured and arranged to include a first ON position, a second ON position and an OFF position. The first ON position and the second ON position are formed by a first electrical contact and a second electrical contact, respectively. The comparison section is configured and arranged to produce a first output signal when the manual input device is in the first ON position and a second output signal when the manual input device is in the second ON position. The signal line extends between the manual input device and the comparison section. The power line includes a first electrical power supply path electrically coupling a power source to the comparison section and a second electrical power supply path coupling the power source to the first electrical contact of the manual input device. The power disconnect switch is disposed in the first electrical power supply path between the power source and the comparison section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is a side elevational view of a bicycle having a pair of operating devices that control/operate an electronically controlled drive train in accordance with one embodiment of the present invention;

FIG. 2 is a top plan view of the handlebar portion of the bicycle illustrated in FIG. 1 with the cycle computer and the pair of manual operating or input devices coupled thereto in accordance with one embodiment of the present invention;

DETAILED DESCRIPTION OF THE PREFERRED EMBODIMENTS

Figure 4:
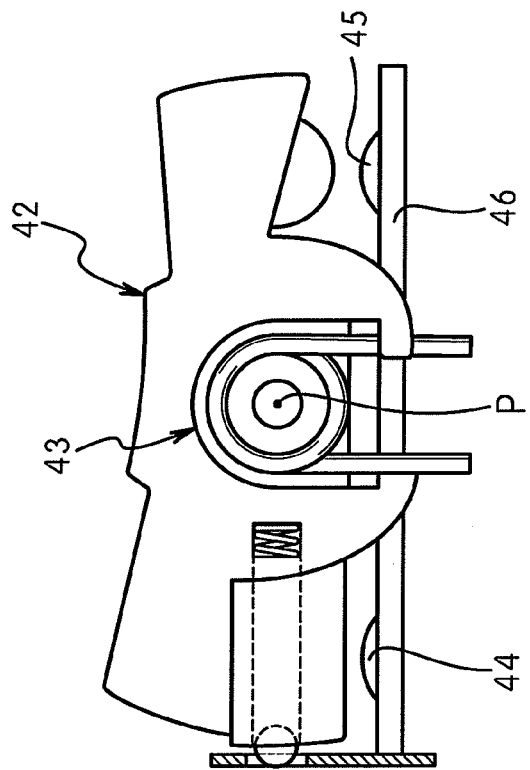
FIG. 4 is an enlarged diagrammatic side elevational view of the manual operating or input device illustrated in FIG. 3, when in a normal rest or OFF position (toggle neutral position)
Figure 3:
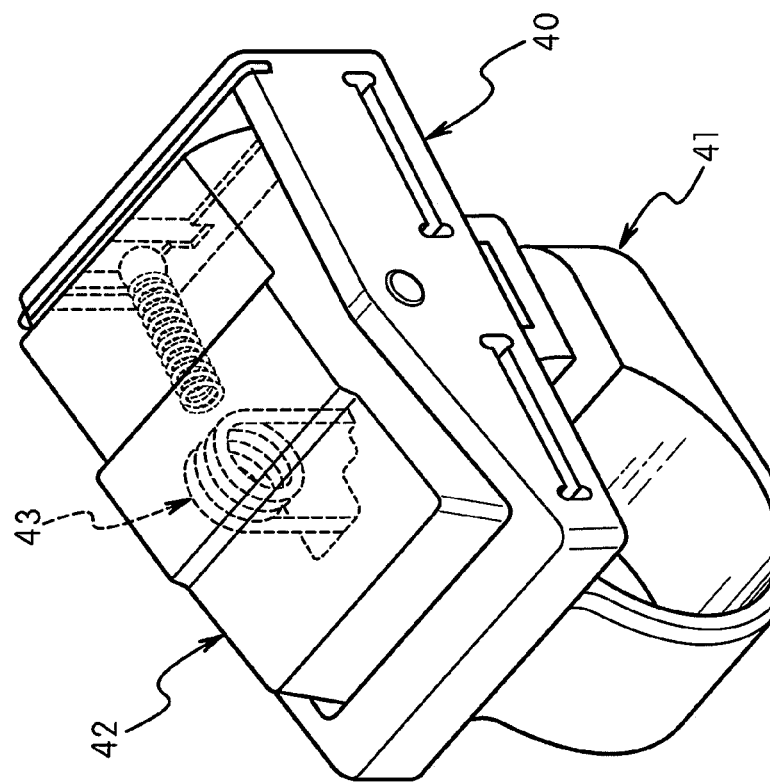
FIG. 3 is an enlarged perspective view of one of the manual operating or input devices in accordance with an embodiment of the present invention.
Figure 6:
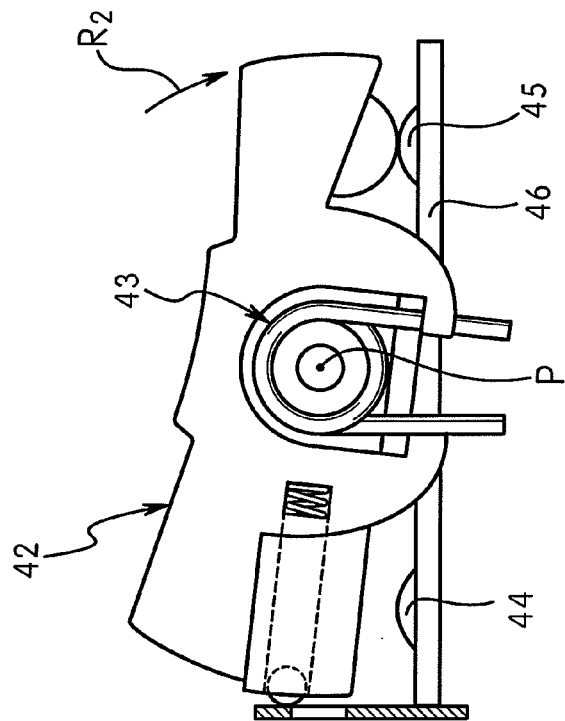
FIG. 6 is an enlarged diagrammatic side elevational view of the manual operating or input device illustrated in FIGS. 3-5 when in a second ON position that causes a downshift.
Figure 5:
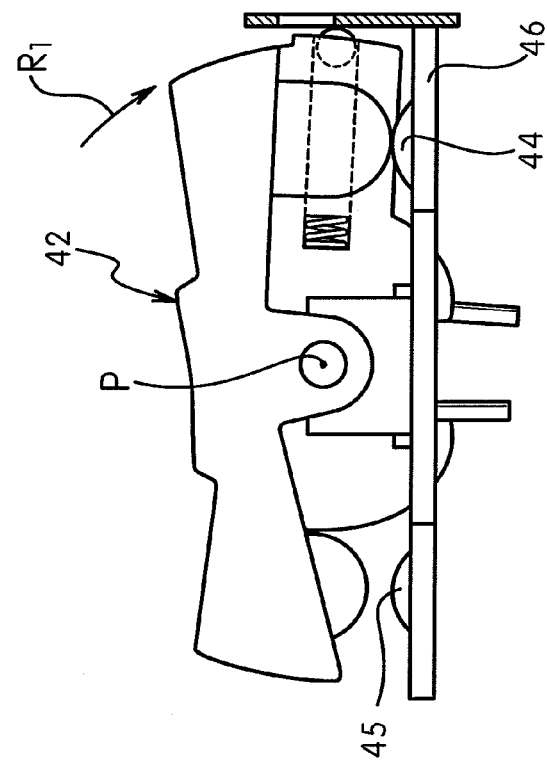
FIG. 5 is an enlarged diagrammatic side elevational view of the manual operating or input device illustrated in FIGS. 3 and 4 when in a first ON position that causes an upshift.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 and 2, a bicycle 10 is illustrated that is equipped with a first embodiment of the present invention, as discussed below. Basically, the bicycle 10 includes an electronically controlled drive train 12 mounted on a frame 14 having a handlebar 16 and a pair of wheels 18 coupled to the frame 14. The electronically controlled drive train 12 is controlled and operated in response to manipulation of a rear shift operating device 20 and a front shift operating device 22. The shift operating devices 20 and 22 constitute first and second manual input devices that are configured and arranged to include a first ON (downshift) position ON1, a second ON (upshift) position ON2 and an OFF (normal neutral) position OFF.

The shift operating devices 20 and 22 are electrically coupled to a cycle computer 24 for controlling the upshifting and the downshifting of the electronically controlled drive train 12. Preferably, the cycle computer 24 is electrically coupled to a plurality of sensors that provide information on the current operating conditions of the bicycle 10. While only a speed sensor arrangement 26 is illustrated, it will be apparent to those skilled in the art from this disclosure that any number of sensors that are used to provide current operating conditions of the bicycle 10 can be used in conjunction with the present invention. For example, the pulse signals from a hub dynamo can be used as a speed sensor or a pedal torque sensor can be used to provide a pedaling torque to the cycle computer 24.

Preferably, the electronically controlled drive train 12 basically includes a rear motorized derailleur 28, a front motorized derailleur 30, a chain 32, a front crankset 34 and a plurality of rear cassette sprockets 36. Of course, other types of drive trains can be used with the shift operating devices 20 and 22. For example, an internal gear hub can be operated by one of the shift operating devices 20 and 22. The drive train 12 is operated by the shift operating devices 20 and 22 and/or the cycle computer 24, as discussed below in more detail. In particular, the rear shift operating device 20 upshifts and downshifts the rear derailleur 28, while the front shift operating device 22 upshifts and downshifts the front derailleur 30. More preferably, the cycle computer 24 electrically operates the rear derailleur motor 28a and front derailleur motor 30a by utilizing rear derailleur sensor 28b and front derailleur sensor 30b. The rear derailleur motor 28a and front derailleur motor 30a may be operated automatically or manually.

One example of an automatic shifting assembly that can be adapted to be used with the present invention is disclosed in U.S. Pat. No. 6,073,061 to Kimura, which is assigned to Shimano Inc.

A power source in the form of a battery 38 is mounted to the frame 14. The battery 38 is electrically coupled to the cycle computer 24 and the motorized derailleurs 28 and 30 for providing electrical power thereto.

The bicycle 10 and its various components are well known in the prior art, except for the improved cycle computer 24 of the present invention as seen in FIGS. 7-12. Thus, the bicycle 10 and its various components will not be discussed or illustrated in detail herein, except for the components that relate to the improved bicycle cycle computer 24 of the present invention.

As seen in FIG. 2, the rear and front shift operating devices 20 and 22 are identical to each other, except that they are mirror images of each other. The rear shift operating device 20 is basically an electrical switch device that controls the rear derailleur 28. The front shift operating device 22 is basically an electrical switch device that controls the front derailleur 30. Since the shift operating devices 20 and 22 are identical to each other, except that they are mirror images, only the shift operating device 20 will be discussed and illustrated in detail herein to explain the present invention.

As seen in FIGS. 3-6, the shift operating device 20 basically includes a base portion 40 with a mounting portion 41, a toggle portion 42, a biasing element or spring 43 and two electrical contacts 44 and 45. The electrical contacts 44 and 45 are formed on a printed circuit board 46 that is electrically coupled to the cycle computer 24. The shift operating device 20 is adapted to be secured on the handlebar 16 of the bicycle 10 by the mounting portion 41.

The toggle portion 42 is pivotally mounted on the base portion 40 for selectively contacting the electrical contacts 44 and 45 that are operatively connected to the rear shift operating device 20 via the cycle computer 24 to upshift or downshift the rear derailleur 28. In particular, the toggle portion 42 is pivotally mounted to the base portion 40 about a pivot axis P and biased by the preloaded spring 43 to a toggle neutral position OFF where the toggle portion 42 is spaced from the first and second electrical contacts 44 and 45. Preferably, the spring 43 is a torsion spring that holds the toggle portion 42 in a neutral position OFF relative to the first and second contacts 44 and 45. The biasing spring 43 has its coiled part concentrically arranged about the pivot axis P and its free ends contacting both the base portion 40 and the toggle portion 42 to urge the toggle portion 42 to the neutral position OFF. Movement of the toggle portion 42 relative to the base portion 40 about the pivot axis P causes the free ends of the biasing spring 43 to be compressed together. When the toggle portion 42 is moved relative to the base portion 40 about the pivot axis P in a first rotational direction $R_1$, the toggle portion 42 moves from the neutral position OFF where the toggle portion 42 is spaced from the first and second electrical contacts 44 and 45 to a first contact position ON1 where the toggle portion 42 contacts or depresses the first electrical contact switch 44. When the toggle portion 42 is moved relative to the base portion 40 about the pivot axis P in a second opposite rotational direction $R_2$, the toggle portion 42 moves from the neutral position OFF where the toggle portion 42 is spaced from the first and second electrical contacts 44 and 45 to a second contact position ON2 where the toggle portion 42 contacts acts or depresses the second electrical contact switch 45.

Figure 7:
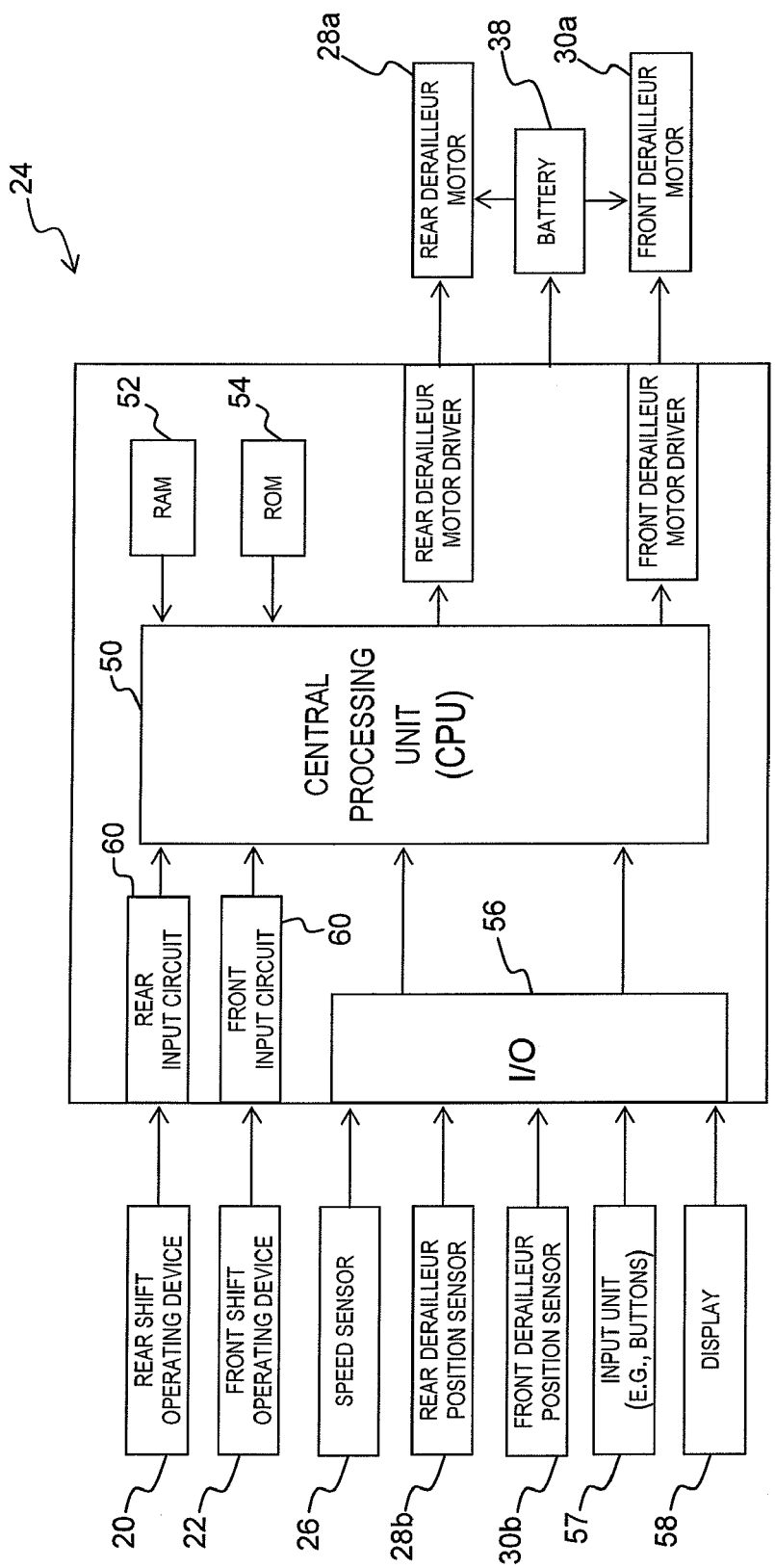
FIG. 7 is a block diagram of a cycle computer for controlling an automatic shifting system.

As seen in FIG. 7, a simplified block diagram is illustrated showing the main components of the cycle computer 24 that is configured for controlling the shifting system. The cycle computer 24 preferably includes a microcomputer formed on a printed circuit board that is powered by the battery 38 or a dynamo. The microcomputer of the cycle computer 24 includes a processor or central processing unit (CPU) 50, a random access memory component (RAM) 52, a read only memory component (ROM) 54 and an I/O interface 56. The CPU 50 is operatively coupled to an input unit 57 and a display 58.

The CPU 50 controls the display and delivers control signals to rear derailleur 28 or front derailleur 30. Software for shift control is stored in the ROM 54. Temporary information accessed while the CPU 50 is performing its main functions is stored in the RAM 52. The I/O interface 56 provides ports for receiving signals from various sensors. The I/O interface 56 further provides ports for receiving input from the rear shift operating device 20 and the front shift operating device 22. The various components of the microcomputer are well known in the bicycle field. Therefore, the components used in the microcomputer of the cycle computer 24 will not be discussed or illustrated in detail herein.

Moreover, it will be apparent to those skilled in the art from this disclosure that the cycle computer 24 can include various electronic components, circuitry and mechanical components to carryout the present invention. Of course, it will be apparent to those skilled in the art from this disclosure that the cycle computer 24 can have a variety of configurations, as needed and/or desired. For example, the cycle computer 24 can be divided into a display unit and a control unit with the control unit mounted at a different location on the bicycle frame from the display unit. In the illustrated embodiment, the cycle computer 24 functions as a display unit and a shift control unit.

Preferably, the display 58 of the cycle computer 24 is configured and arranged to display various information to the rider. The cycle computer 24 operates the derailleurs 28 and 30 based on input from the rider via the shift operating devices 20 and 22 and/or input from the speed sensor 22. Thus, the shift operating devices 20 and 22 are operatively coupled to the derailleurs 28 and 30.

Referring now to FIGS. 8-12, the input circuits 60 will now be discussed in more detail. The input circuits 60 are part of a bicycle derailleur controller that is configured to output a shifting command. First electrical contact 44, second electrical contact 45 and toggle portion 42 are diagrammatically represented in FIG. 7 as part of the manual input device S2. While the input circuits 60 of the bicycle component of the present invention are illustrated as being used with the rear and front shifting devices 28 and 30, it will be apparent to those skilled in the art from this disclosure that the input circuit 60 of the bicycle component can be used to operate any electronically controlled bicycle device. For example, the bicycle component input circuit 60 can be used to operate/control an electronically controlled suspension in accordance with the present invention.

Furthermore, it should be clear from the present description that rear shift operating device 20 and front shift operating device 22 each utilize an input circuit 60 in the same way. Therefore, although input circuit 60 is referred to singularly below, it is understood that each input circuit 60 utilized by rear shift operating device 20 and front shift operating device 22 are characterized in this disclosure.

The input circuit 60 basically comprises three main current flow pathways: a power line Va, a signal line INa and a ground line GND. The signal line INa is electrically coupled to a manual input device S2 of the shift operating device 20 or 22. The signal line INa is configured and arranged to be selectively coupled to a first electrical contact 44 or a second electrical contact 45.

The manual input device S2 is an electronic shift operating device that is configured to be mounted to a bicycle. The manual input device S2 is configured and arranged to include a first ON position formed by a first electrical contact 44, a second ON position formed by a second electrical contact 45 and an OFF position.

The input circuit 60 is electrically coupled to the manual input device S2. The input circuit 60 includes a comparison section configured and arranged to produce a first output signal when the manual input device S2 is in the first ON position ON1 and a second output signal when the manual input device S2 is in the second ON position ON2.

A first path of the input circuit 60 includes the signal line INa, which extends between the manual input device S2 and the comparison section (discussed below). A first section of the first path includes the electrical wiring having a resistor R1, having a known resistance, a pair of the nodes 78 and 80 and an input pin Vp2. The electrical wiring connected between the nodes 76 and 80 with a diode D1 constitutes a second section of the first path. Still yet a third section of the first path includes the electrical wiring connected between the nodes 76 and 78 that includes a resistor R2, having a known resistance. First, second and third sections of the first path contribute to the signal at the input pins Vp2 and Vp5. The electrical wiring connected between the nodes 74 and 82A with a resistor R4 having a known resistance constitutes a fourth section of the first path. An intermediate section of the first path includes resistor R5, having a known resistance and connected between the nodes 82 and 84. The fourth section of the first path as well as the intermediate section of the first path contributes to the signal at the reference pins Vp3 and Vp6.

A second path includes the ground line GND. The ground line GND is electrically coupled to the manual input device S2 to selectively connect the second electrical contact 45 to the signal line INa when the manual input device S2 is in the second ON position ON2. The second path is electrically coupled to the comparison section via the ground line GND. A first section of the second path includes diode D2, connected between the node 80 and the ground line GND. Resistor R3, having a known resistance, constitutes a second section of the second path and is connected between the node 78 and the ground line GND. Still yet a third section includes resistor R6, having a known resistance and connected between the node 84 and ground line GND. First, second and third sections of the second path play an influential role in the signal at the input pins Vp2 and Vp5 and the reference pins Vp3 and Vp6.

The power line Va comprises a first electrical power supply path V1 that electrically couples a power source 38 to the comparison section via power disconnect switch S1. The power disconnect switch S1 is disposed in the first electrical power supply path V1 between the power source and the comparison section. The first electrical power supply path V1 includes a first section formed between the power source 38 and the power disconnect switch S1. The first electrical power supply path further includes a second section formed between the power disconnect switch S1 and the comparison section and is electrically coupled to the signal line INa.

The power line Va further comprises a second electrical power supply path that couples the power source 38 to the first electrical contact 44 of the manual input device S2. When the manual input device is in the first ON position ON1, the signal line INa is selectively coupled to the power line Va, which is electrically connected to the first electrical contact 44 via the second electrical power supply path.

The input circuit 60 is electrically coupled to a comparison section, power line Va, signal line INa and ground GND. The input circuit 60 includes the resistor R1 electrically coupled to the first and second diodes D1 and D2 at the node 80. The first and second diodes D1 and D2 are connected to the resistors R2 and R3 in parallel. The resistors R2 and R3 are connected to the resistors R4, R5 and R6 in parallel. The first and second diodes D1 and D2 are connected to each other in series. The resistors R2 and R3 are connected to each other in series. The resistors R4, R5 and R6 are connected to each other in series.

The amount of resistance assigned to the resistors R1-R6 is an integral part of the unique design and function of the present invention. The resistor R1 has a resistance that is much smaller than R2 or R3, i.e. R1<<R2 and/or R1<<R3. For example, the resistor R1 can be 100 ohms and the resistors R2 and R3 can equal 150 kilo-ohms. Similarly, for example, the resistors R4 and/or R6 can be 47 kilo-ohms while the resistor R5 can be 150 kilo-ohms. It will be apparent to one of skill in the art from this disclosure that other combinations of values can be used as long as there is a significant quantitative difference in resistivity between the resistors.

The comparison section comprises the first comparator 86 and the second comparator 88 and is electrically coupled to the power line Va and the signal line INa. The first comparator 86 is configured and arranged to produce a first output signal OUT1 based on a comparison of the first input signal with the reference signal, delivered via the input pins Vp2, Vp5 and the reference pins Vp3, Vp6, respectively, as well as the signal at a first power supply pin U1A. The reference signal is derived from the signal line INa and/or the power line Va. The second comparator 88 is configured and arranged to produce a second output signal OUT2 based on a comparison of the second input signal with the reference signal delivered via the input pins Vp2 and Vp5 and the reference pins Vp3 and Vp6, respectively, as well as the signal at a second power supply pin U1B. Accordingly, the first comparator 86 will deliver an output signal OUT1 when the voltage input pin Vp2 is higher than the voltage at the reference pin Vp3. Likewise, the second comparator 88 will deliver an output signal OUT2 when the voltage input pin Vp5 is lower than the reference pin Vp6. The CPU 50 is operatively coupled to the comparison section to receive the first and second output signals OUT1, OUT2.

The reference signal is derived from the signal line INa and/or the power line Va. The power line Va and signal line INa are configured and arranged such that the signal line produces an OFF signal that is substantially equal to half of the reference signal from the power line when the manual input device S2 is in the OFF position.

Furthermore, the power line Va and the signal line INa are configured and arranged such that the first input signal of the signal line INa is greater than or equal to half of the reference signal from the power line Va when the manual input device S2 is in the first ON position ON1. The power line Va and the signal line INa are further configured and arranged such that the second input signal of the signal line INa is less than or equal to half of the reference signal from the power line Va when the manual input device S2 is in the second ON position ON2.

Figure 8:
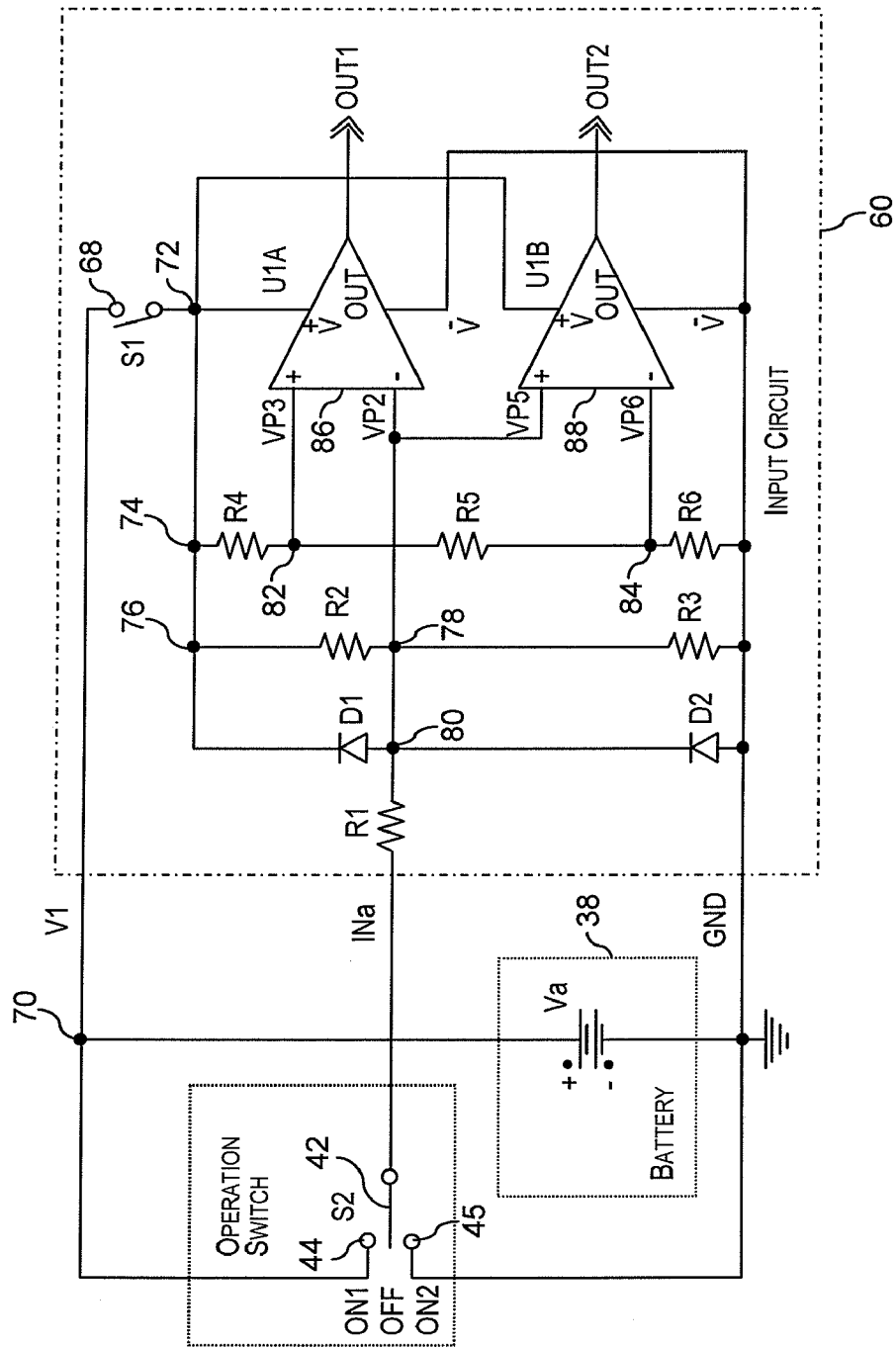
FIG. 8 is a bicycle component input circuit in accordance with one embodiment of the present invention, with the first switch in the normal rest or OFF position and the second switch in the open position such that the bicycle component input circuit is in a power saving mode.

Turning now to FIG. 8, the bicycle component input circuit is illustrated when the power disconnect switch S1 is in the OFF position and the manual input device S2 is in the OFF position, such that the input circuit 60 is in a power saving mode. In this configuration, power is not drained from the battery 38 because both the power disconnect switch S1 and the manual input device S2 have broken the current flow path to the input circuit 60.

Figure 9:
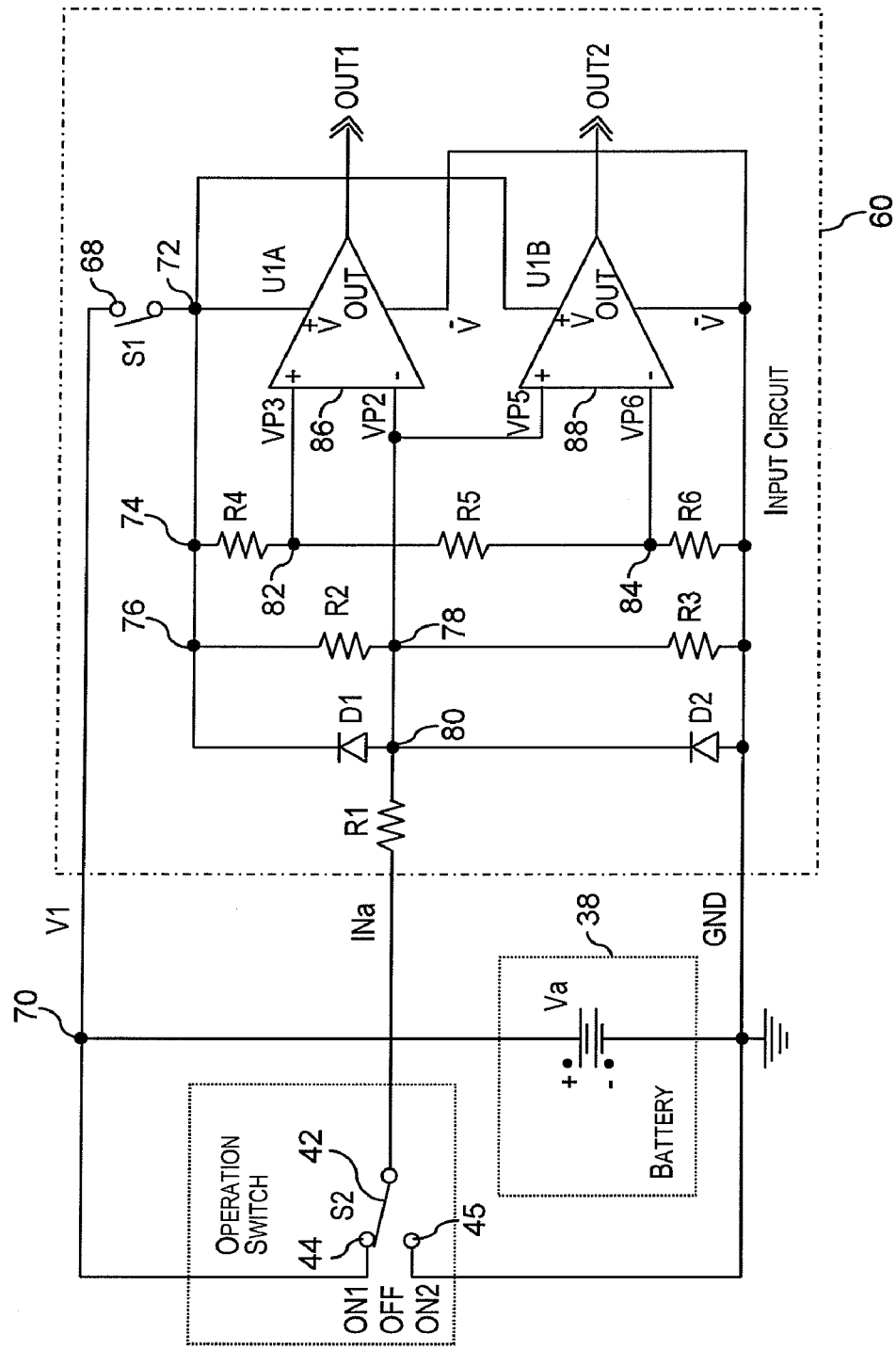
FIG. 9 is the bicycle component input circuit of FIG. 8, with the first switch in the first ON position and the second switch in the open position such that the cycle computer receives a signal to close the second switch.

FIG. 9 illustrates a separate configuration where the power disconnect switch S1 is in the open position and the manual input device S2 is in the ON1 position. When the manual input device S2 is in the ON1 position, the voltage from the battery 38 is delivered to the signal line INa via the first electrical contact 44. The voltage flows through the resistor R1 to the node 80. At the node 80, the voltage flows toward the diode D1 and toward the input pins Vp2 and Vp5 via the node 78. The voltage flowing through diode D1 flows to the node 76. At the node 76, the voltage flows on to the power supply pins U1A and U1B via the nodes 72 and 74. At the node 74, the voltage flows through resistor R4 toward the resistor R5 via the node 82. At the node 82, the voltage flows toward the reference pin Vp3. The voltage also continues on through the resistor R5 to the reference pin Vp6 via the node 84.

In the configuration of FIG. 9, the voltage at the input pin Vp2 is nearly equal to the power line Va and is greater than the voltage of the reference pin Vp3. Likewise, the voltage of the input pin Vp5 is nearly equal to the power line Va and is greater than the voltage of the reference pin Vp6.

The CPU 50 is configured and arranged to operatively control the power disconnect switch S1 such that, in the configuration of FIG. 9, when the CPU 50 receives a signal that the ON1 position has been selected, the CPU 50 then outputs a control signal to close the power disconnect switch S1. In this manner, the input circuit 60 is restarted and taken out of the power saving mode.

In both of the configurations illustrated in FIGS. 8 and 9, the power disconnect switch S1 is in the open position. This power saving feature is initiated after a predetermined period of inactivity. For example, after fifteen minutes have passed since the manual input device S2 was last operated, the CPU 50 will transmit a control signal to operate the first switch S1 so that it will move to the open or OFF position.

When the power disconnect switch S1 is in the OFF position, the voltage at the input pins Vp2 and Vp5 vary according to the position of the manual input device S2. For example, when the manual input device S2 is in the ON1 position, the input pins Vp2 and Vp5 are nearly equal to power line Va. Similarly, when the manual input device S2 is in the ON2 position, the input pins Vp2 and Vp5 are nearly equal to ground GND. In the same way, when the manual input device S2 is in the OFF position, the input pins Vp2 and Vp5 are open.

Figure 10:
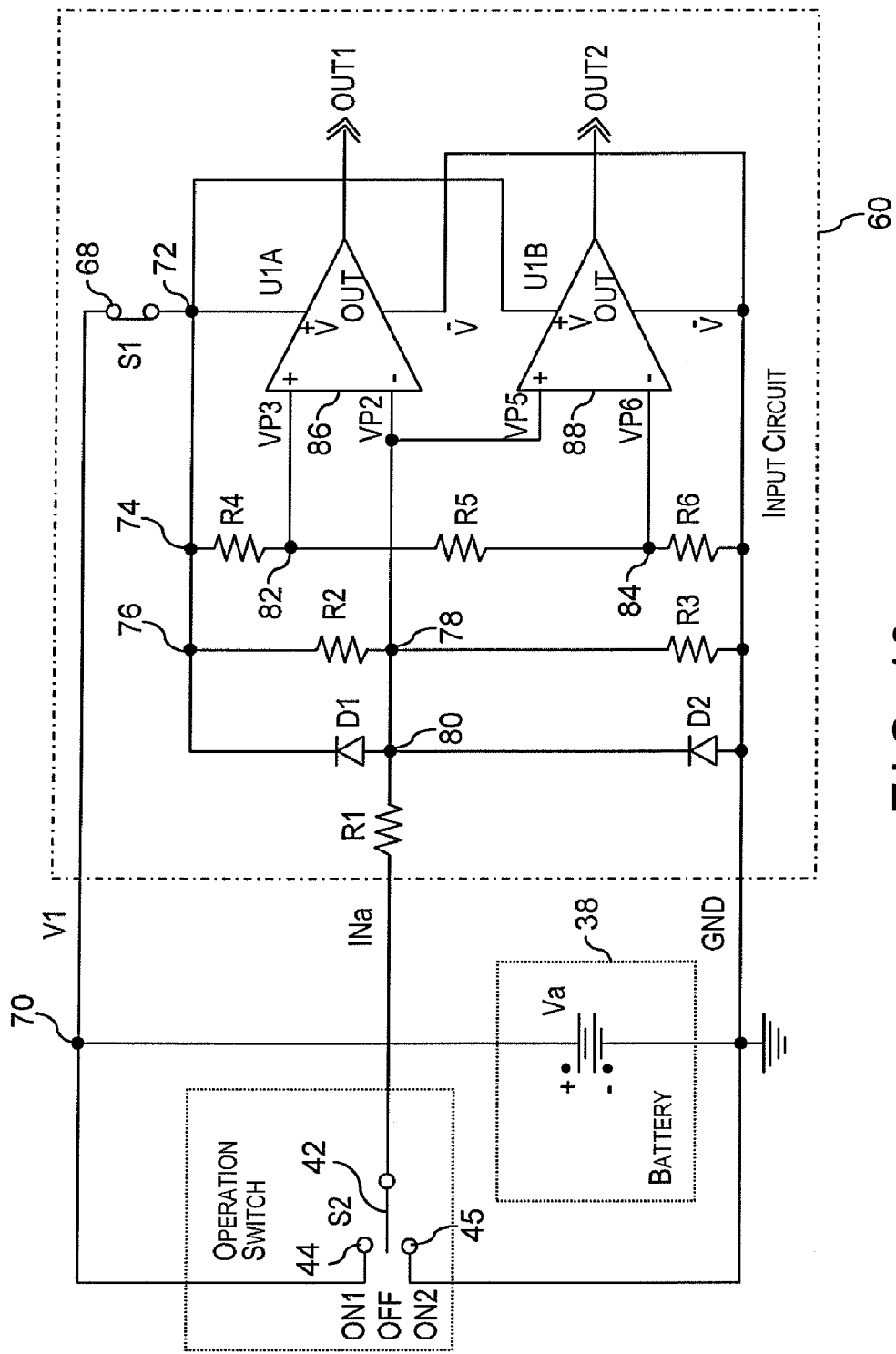
FIG. 10 is the bicycle component input circuit of FIGS. 8 and 9, with the first switch in the OFF position and the second switch in the closed position such that the bicycle component input circuit is ready for either upshifting or downshifting.

FIG. 10 illustrates a configuration where the power disconnect switch S1 is in the closed position such that the bicycle component input circuit is no longer in the power saving mode. The manual input device S2 is in the OFF position. The bicycle component input circuit embodiment illustrated in FIG. 10 is ready for either upshifting by selecting ON2 or downshifting by selecting ON1. Accordingly, the voltage at the input pins Vp2 and Vp5 is one half of the voltage of the power line Va.

Referring to the configuration of FIG. 10, the voltage at the input pin Vp2 is half of the voltage of the power line Va when R2 equals R3. For all of the illustrated embodiments, the electrical potential is the same at the input pins Vp2 and Vp5. That is, the voltage at the input pin Vp2 can be represented as:

$$Vp2 = Va \times \frac{R3}{R2 + R3}$$

As can be seen from above, when R2=R3, the voltage at the input pins Vp2 and Vp5 is half of the voltage at power line Va.

Figure 11:
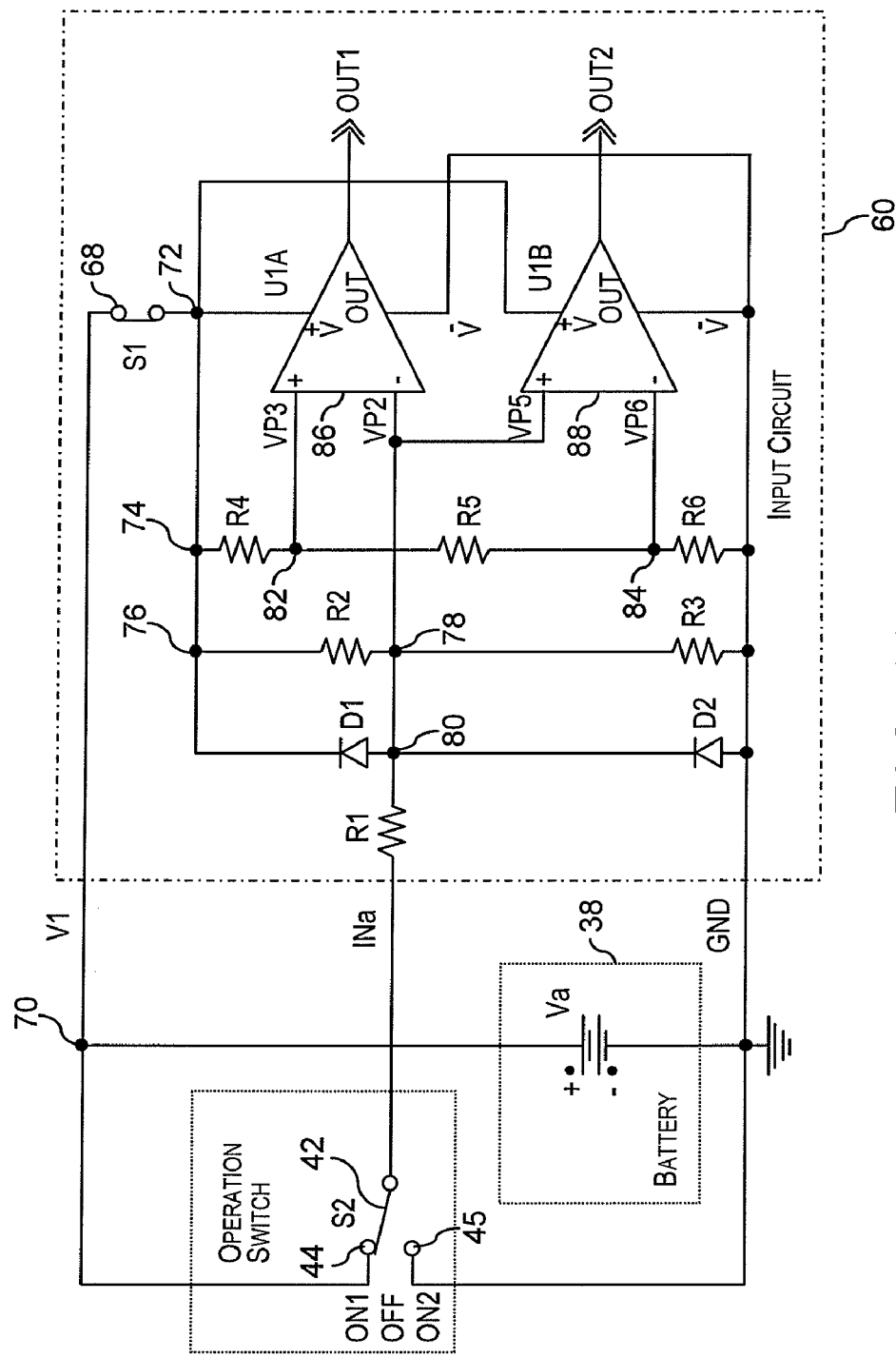
FIG. 11 is the bicycle component input circuit of FIGS. 8-10, with the first switch in the first ON position and the second switch in the closed position such that an upshift occurs.

Referring to FIG. 11, another embodiment of the present invention is illustrated. A first input signal is generated by operation of the power disconnect switch S1 so that current flows through a third electrical contact 68 and by operation of the manual input device S2 in the downshift position ON1 wherein current flows through the first electrical contact 44. In this configuration, current flows from the battery 38 to the node 70. At the node 70, the power is delivered to both signal line INa via the first electrical contact 44 and the first electrical power supply path V1. Current flows through the signal line INa to the input pins Vp2 and Vp5 via the nodes 80 and 78. Referring to the power line Va, current flows through the power line Va to the first electrical power supply path V1 to the third electrical contact 68 and to the node 72. From the node 72, the signal flows to the first power supply pin U1A and the second power supply pin U1B. Also from the node 72, the signal flows to the reference pins Vp3 and Vp6, via the nodes 74, 76, 78, and 82 or 84.

In the embodiment of FIG. 11, the voltage at the input pin Vp2 is greater than or equal to the voltage of power line Va and greater than or equal to half of the voltage of power line Va. The voltage at the input pins Vp2 and Vp5 is calculated as follows.

$$Va \rightarrow S1 \rightarrow R2 \rightarrow Vp2 = Vp5 = Va \times \frac{R3}{R2 + R3}$$

$$Va \rightarrow R1 \rightarrow Vp2 = Vp5 = Va \times \frac{R1}{R1 + R3}$$

For the embodiment of FIG. 11, the voltage at the input pin Vp2 is nearly equal to the power line Va and is greater than the voltage at the reference pin Vp3 because the above current paths are connected in parallel to each other. Likewise, the voltage at the input pin Vp5 is nearly equal to the power line Va and is greater than the voltage at the reference pin Vp6. The voltages at the reference pins Vp3 and Vp6 are calculated as shown below.

$$Vp3 = Va \times \frac{R5 + R6}{R4 + R5 + R6} \quad Vp6 = Va \times \frac{R6}{R4 + R5 + R6}$$

Figure 12:
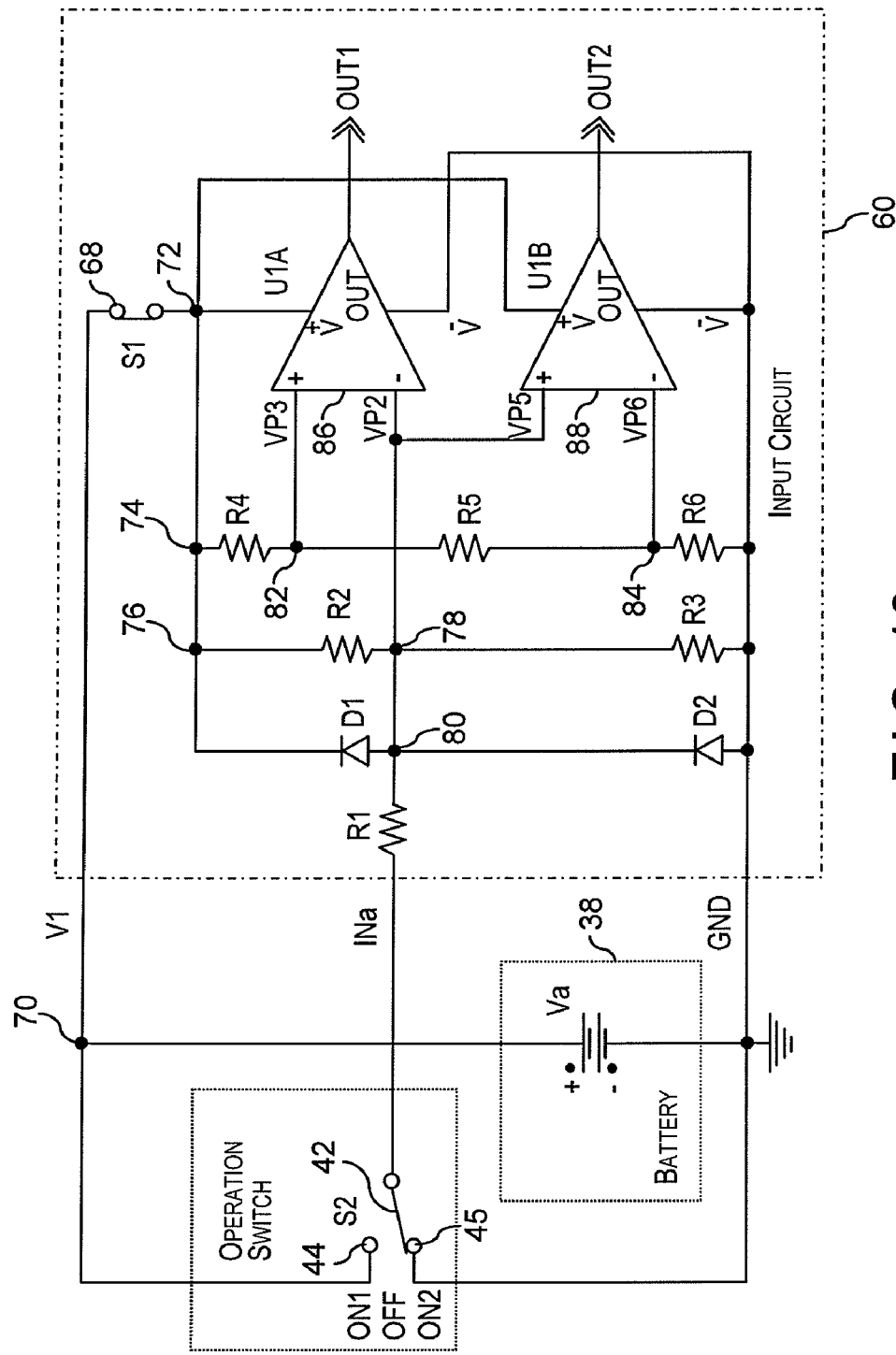
FIG. 12 is the bicycle component input circuit of FIGS. 8-11, with the first switch in the second ON position and the second switch in the closed position such that a downshift occurs.

Turning to FIG. 12, another embodiment of the present invention is illustrated. A second input signal is generated by operation of the power disconnect switch S1 so that current flows through a third electrical contact 68 and by operation of the manual input device S2 in the upshift position ON2 wherein current flows through the second electrical contact 45. In this configuration, current flows from the battery 38 to the node 70. At the node 70, all of the power is delivered to first electrical power supply path V1. In other words, current flows through power line Va to first electrical power supply path V1 to third electrical contact 68 and to the node 72. From the node 72, the signal flows to the first power supply pin U1A and the second power supply pin U1B. Also from the node 72, the signal flows to the reference pins Vp3 and Vp6, via the nodes 74, 76, 78, and 82 or 84 to deliver a reference signal. At the node 78, current flows through the first resister R1 and the signal line INa towards ground via second electrical contact 45.

In the configuration of FIG. 12, the voltage at the input pin Vp2 is less than or equal to half of the voltage of the power line Va and greater than or equal to the voltage of the ground line GND.

For the embodiments where the power disconnect switch S1 is positioned such that current flows through a third electrical contact 68, the voltage at reference pins Vp3 and Vp6 can be calculated as follows.

$$Vp3 = Va \times \frac{R5 + R6}{R4 + R5 + R6} \quad Vp6 = Va \times \frac{R6}{R4 + R5 + R6}$$

In the automatic mode, shifting of each of the motorized derailleurs 28 and 30 is preferably at least partially based on the speed of the bicycle and the torque applied to the pedals. Thus, the cycle computer 24 further includes at least one speed sensing/measuring device 26 or component and at least one torque sensing/measuring device or component. The speed sensing/measuring device or component 26 provides information indicative of the speed of the bicycle 10 to the central processing unit of the cycle computer 24. The torque sensing/measuring device or component provides information indicative of the torque applied to the pedals to the central processing unit of the cycle computer 24. The sensing/measuring components generate predetermined operational commands indicative of the speed of the bicycle 10 and the torque applied to the pedals, respectively. Of course, additional sensing/measuring components can be operatively coupled to central processing unit of the cycle computer 24 such that predetermined operational commands are received by the central processing unit (CPU) of the cycle computer 24 to automatically operate the derailleur motors 28a and 30a, the motorized derailleurs 28 and 30 or other components.

The speed sensor arrangement 26 is a sensing/measuring component that can be, for example, a reed switch and a magnet. The speed sensor arrangement 26 is preferably a magnetically operable sensor that is mounted on the front fork of the bicycle 10 and senses the magnet that is attached to one of the spokes of the front wheel of the bicycle 10. The reed switch of the speed sensor arrangement 26 generates a pulse each time wheel of the bicycle 10 has turned a prescribed angle or rotation. In other words, the speed sensor arrangement 26 detects the rotational velocity of the front wheel of the bicycle 10. As soon as speed sensor arrangement 26 generates the pulse or signal, a pulse signal transmission circuit sends this pulse signal to the central processing unit of the cycle computer 24. The cycle computer 24 determines whether the chain 32 should be upshifted or downshifted, based on this speed information and any other relevant information that it has available. Thus, the speed sensor arrangement 26 forms a sensing device or measuring component of the cycle computer 24. In other words, the speed sensor arrangement 26 outputs a bicycle speed signal by detecting the magnet mounted on the front wheel of the bicycle 10. Thus, speed information is sent to the cycle computer 24 to operate the motorized derailleur assemblies 28 and 30, as needed and/or desired.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In the description of the present invention, the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component comprising:
    a manual input device configured and arranged to include a first ON position formed by a first electrical contact, a second ON position formed by a second electrical contact and an OFF position; and
    an input circuit electrically coupled to the manual input device, the input circuit including
        a signal line configured and arranged to be selectively coupled to the first and second electrical contacts by operation of the manual input device to produce first and second input signals, respectively, with different electrical characteristics,
        a power line electrically coupled to the manual input device and configured and arranged to be connected to a power source, and
        a comparison section electrically coupled to the power line and the signal line and configured and arranged to produce a first output signal based on a comparison of the first input signal with a reference signal from the power line and a second output signal based on a comparison of the second input signal with the reference signal from the power line.

2. The bicycle component according to claim 1, wherein the manual input device is an electronic shift operating device that is configured to be mounted to a bicycle.

3. The bicycle component according to claim 2, wherein the input circuit is part of a bicycle derailleur controller that is configured to output a shifting command.

4. The bicycle component according to claim 1, wherein the comparison section is further configured and arranged to produce the first output signal when the first input signal is larger than the reference signal; and
the comparison section is further configured and arranged to produce the second output signal when the second input signal is smaller than the reference signal.

5. The bicycle component according to claim 1, wherein the comparison section is further configured and arranged to compare voltage of the reference signal to voltages of the first and second input signals.

6. The bicycle component according to claim 1, wherein the comparison section includes a first comparator coupled to the signal line and the power line to produce the first output signal and a second comparator coupled to the signal line and the power line to produce the second output signal.

7. The bicycle component according to claim 1, wherein the power line and the signal line include resistors configured and arranged to control voltage levels of the first and second input signals and reference signal.

8. The bicycle component according to claim 1, further comprising
    a power disconnect switch disposed in the power line between the power source and the comparison section.

9. The bicycle component according to claim 8, further comprising
    a processor operatively coupled to the comparison section to receive the first and second output signals.

10. The bicycle component according to claim 9, wherein the processor configured and arranged to operatively control the power disconnect switch.

11. The bicycle component according to claim 1, further comprising
    a processor operatively coupled to the comparison section to receive the first and second output signals.

12. The bicycle component according to claim 1, further comprising
    a ground line electrically coupled to the manual input device to selectively connect the second electrical contact to the signal line when the manual input device is in the second ON position.

13. The bicycle component according to claim 12, wherein the power line is electrically connected to the first electrical contact and selectively coupled to the signal line when the manual input device is in the first ON position.

14. The bicycle component according to claim 13, wherein the comparison section is further configured and arranged to produce the first output signal when the first input signal is larger than the reference signal; and the comparison section is further configured and arranged to produce the second output signal when the second input signal is smaller than the reference signal.

15. The bicycle component according to claim 13, wherein the comparison section is further configured and arranged to compare voltage of the reference signal to voltages of the first and second input signals.

16. The bicycle component according to claim 13, wherein the comparison section includes a pair of comparators that produce the first and second output signals.

17. The bicycle component according to claim 13, wherein the power line and the signal line include resistors configured and arranged to control voltage levels of the first and second input signals and reference signal.

18. The bicycle component according to claim 13, further comprising
a power disconnect switch disposed in the power line between the power source and the comparison section.

19. The bicycle component according to claim 18, further comprising
a processor operatively coupled to the comparison section to receive the first and second output signals.

20. The bicycle component according to claim 19, wherein the processor configured and arranged to operatively control the power disconnect switch.

21. The bicycle component according to claim 13, further comprising
a processor operatively coupled to the comparison section to receive the first and second output signals.

22. A bicycle component comprising:
a manual input device configured and arranged to include a first ON position formed by a first electrical contact, a second ON position formed by a second electrical contact and an OFF position; and
an input circuit electrically coupled to the manual input device, the input circuit including
a signal line configured and arranged to be selectively coupled to the first and second electrical contacts by operation of the manual input device to produce first and second input signals, respectively, with different electrical characteristics,
a power line electrically coupled to the manual input device and configured and arranged to be connected to a power source, and
a comparison section electrically coupled to the power line and the signal line and configured and arranged to produce a first output signal based on a comparison of the first input signal with a reference signal from the power line and a second output signal based on a comparison of the second input signal with the reference signal from the power line, the comparison section being further configured and arranged to compare voltage of the reference signal to voltages of the first and second input signals,
the power line and the signal line being configured and arranged such that the signal line produces an OFF input signal that is substantially equal to half the reference signal from the power line when the manual input device is in the OFF position.

23. The bicycle component according to claim 22, wherein the power line and the signal line are configured and arranged such that the first input signal of the signal line is greater than or equal to half the reference signal from the power line when the manual input device is in the first ON position; and
the power line and the signal line are further configured and arranged such that the second input signal of the signal line is less than or equal to half the reference signal from the power line when the manual input device is in the second ON position.

24. The bicycle component according to claim 23, wherein the comparison section includes a first comparator coupled to the signal line and the power line to produce the first output signal and a second comparator coupled to the signal line and the power line to produce the second output signal.

25. A bicycle component comprising:
a manual input device configured and arranged to include a first ON position formed by a first electrical contact, a second ON position formed by a second electrical contact and an OFF position;
an input circuit electrically coupled to the manual input device, the input circuit including
a signal line configured and arranged to be selectively coupled to the first and second electrical contacts by operation of the manual input device to produce first and second input signals, respectively, with different electrical characteristics,
a power line electrically coupled to the manual input device and configured and arranged to be connected to a power source, the power line being further electrically connected to the first electrical contact and selectively coupled to the signal line when the manual input device is in the first ON position, and
a comparison section electrically coupled to the power line and the signal line and configured and arranged to produce a first output signal based on a comparison of the first input signal with a reference signal from the power line and a second output signal based on a comparison of the second input signal with the reference signal from the power line; and
a around line electrically coupled to the manual input device to selectively connect the second electrical contact to the signal line when the manual input device is in the second ON position,
the power line and the signal line being configured and arranged such that the signal line produces an OFF input signal that is substantially equal to half the reference signal from the power line when the manual input device is in the OFF position.

26. The bicycle component according to claim 25, wherein the power line and the signal line are configured and arranged such that the first input signal of the signal line is greater than or equal to half the reference signal from the power line when the manual input device is in the first ON position; and
the power line and the signal line are further configured and arranged such that the second input signal of the signal line is less than or equal to half the reference signal from the power line when the manual input device is in the second ON position.

27. The bicycle component according to claim 26, wherein the comparison section includes a first comparator coupled to the signal line and the power line to produce the first output signal and a second comparator coupled to the signal line and the power line to produce the second output signal.

28. A bicycle component comprising:
a manual input device configured and arranged to include a first ON position formed by a first electrical contact, a second ON position formed by a second electrical contact and an OFF position; and
an input circuit electrically coupled to the manual input device, the input circuit including a comparison section configured and arranged to produce a first output signal when the manual input device is in the first ON position and a second output signal when the manual input device is in the second ON position, a signal line extending between the manual input device and the comparison section, a power line including a first electrical power supply path configured and arranged to electrically couple a power source to the comparison section, and a second electrical power supply path coupling the power source to the first electrical contact of the manual input device, and a power disconnect switch disposed in the first electrical power supply path between the power source and the comparison section.

29. The bicycle component according to claim 28, wherein the manual input device is an electronic shift operating device that is configured to be mounted to a bicycle.

30. The bicycle component according to claim 29, wherein the input circuit is part of a bicycle derailleur controller that is configured to output a shifting command.

31. The bicycle component according to claim 28, further comprising a ground line electrically coupled to the manual input device to selectively connect the second electrical contact to the signal line when the manual input device is in the second ON position.

32. The bicycle component according to claim 31, wherein power line is electrically connected to the first electrical contact and selectively coupled to the signal line when the manual input device is in the first ON position.

33. The bicycle component according to claim 32, wherein comparison section is further configured and arranged to produce the first output signal when the first input signal is larger than a reference signal; and the comparison section is further configured and arranged to produce the second output signal when the second input signal is smaller than the reference signal.

34. The bicycle component according to claim 32, wherein the comparison section is further configured and arranged to compare voltage of a reference signal to voltages of the first and second input signals.

35. The bicycle component according to claim 32, wherein comparison section includes a pair of comparators that produce the first and second output signals.

36. The bicycle component according to claim 32, wherein the power line and the signal line include resistors configured and arranged to control voltage levels of the first and second input signals and a reference signal.

37. The bicycle component according to claim 28, wherein first electrical power supply path includes a first section formed between the power source and the power disconnect switch, and a second section formed between the power disconnect switch and the comparison section; and the second section of the first electrical power supply path being electrically coupled to the signal line.

38. The bicycle component according to claim 33, wherein the second section of the first electrical power supply path is further connected to the ground line with a first diode disposed in the second section of the first electrical power supply path between the comparison section and the signal line and a second diode disposed in the second section of the first electrical power supply path between the signal line and the ground line.

39. The bicycle component according to claim 28, further comprising a processor operatively coupled to the comparison section to receive the first and second output signals.

40. The bicycle component according to claim 39, wherein the processor configured and arranged to operatively control the power disconnect switch.

41. The bicycle component according to claim 28, wherein the comparison section is configured and arranged to produce the first output signal based on a comparison of the first input signal with a reference signal from the power line and the second output signal based on a comparison of the second input signal with the reference signal from the power line.

42. The bicycle component according to claim 41, wherein the power line and the signal line are configured and arranged such that the signal line produces an OFF input signal that is substantially equal to half the reference signal from the power line when the manual input device is in the OFF position.

43. The bicycle component according to claim 42, wherein the power line and the signal line are configured and arranged such that the first input signal of the signal line is greater than or equal to half the reference signal from the power line when the manual input device is in the first ON position; and the power line and the signal line are further configured and arranged such that the second input signal of the signal line is less than or equal to half the reference signal from the power line when the manual input device is in the second ON position.

44. The bicycle component according to claim 43, wherein the comparison section includes a first comparator coupled to the signal line and the power line to produce the first output signal and a second comparator coupled to the signal line and the power line to produce the second output signal.

* * * * *